United States Patent
König (10) Patent No.: US 6,994,485 B2
(45) Date of Patent: Feb. 7, 2006

(54) METHOD AND APPARATUS FOR MUTUALLY CONNECTING ELONGATED ELEMENTS, SUCH AS REINFORCEMENT RODS

(75) Inventor: Thomas König, The Hague (NL)

(73) Assignee: Ty tecker V.O.F., Rotterdam (NL)

( * ) Notice: Subject to any disclaimer, the term of this patent is extended or adjusted under 35 U.S.C. 154(b) by 161 days.

(21) Appl. No.: 10/168,291

(22) PCT Filed: Dec. 20, 2000

(86) PCT No.: PCT/NL00/00937

§ 371 (c)(1), (2), (4) Date: Oct. 23, 2002

(87) PCT Pub. No.: WO01/46537

PCT Pub. Date: Jun. 28, 2001

(65) Prior Publication Data

US 2003/0127787 A1 Jul. 10, 2003

(30) Foreign Application Priority Data

Dec. 20, 1999 (NL) ............................................. 1013890
Oct. 18, 2000 (NL) ............................................. 1016432

(51) Int. Cl.
F16D 1/00 (2006.01)

(52) U.S. Cl. .................... 403/229; 403/396; 52/719; 52/712

(58) Field of Classification Search ............ 403/229, 403/396, 391, 392, 393; 52/719, 712
See application file for complete search history.

(56) References Cited

U.S. PATENT DOCUMENTS

| | | | | |
|---|---|---|---|---|
| 4,473,715 A | * | 9/1984 | Beinhaur et al. | 174/87 |
| 5,315,066 A | * | 5/1994 | Spiteri, Sr. | 174/87 |
| 5,531,618 A | * | 7/1996 | Market | 439/840 |
| 5,896,722 A | * | 4/1999 | Swenson | 52/712 |

* cited by examiner

Primary Examiner—John R. Cottingham
(74) Attorney, Agent, or Firm—Varnum, Riddering, Schmidt & Howlett LLP (57) ABSTRACT

A method for mutually connecting at least two elongated elements, such as concrete renforcement rods, by means of a connecting member in the form of a winding spring with a center line, which winding spring is screwed on and around the elongated elements at the connecting place between the two elongated elements by rotation on the center line while expanding by contact with circumferential surfaces of the elongated elements, wherein the selected winding spring is a spiral or screw spiral shaped spring, of which at least one winding has a diameter smaller than the largest transverse dimension at the connecting place, determined by the elongated elements to be connected, which winding spring is placed with its center line at an angle with respect to the elongated elements and is screwingly moved from a thus obtained starting position in the direction of the elongated elements, which screwing movement is continued until at least one winding is diametrically expanded.

25 Claims, 2 Drawing Sheets

METHOD AND APPARATUS FOR MUTUALLY CONNECTING ELONGATED ELEMENTS, SUCH AS REINFORCEMENT RODS

The invention relates to a method for mutually connecting at least two elongated elements, such as concrete reinforcement rods, by means of a connecting member in the form of a winding spring with a center line, which winding spring is screwed on and around the elongated elements at the connecting place between the two elongated elements by rotation on the center line while expanding by contact with circumferential surfaces of the elongated elements. The invention also relates to a connecting member and assembly of connecting members to be used in such a connecting method.

A method as defined above is known from JP-A-03 221665. According to the embodiment shown in FIGS. 5–7 two elongated elements are coupled by screwing around the elements to be connected a relatively weak winding spring having an open inner diameter which is approximately equal to the joint diameters of the elements to be connected. Although a connecting member can thus be fitted in a relatively rapid and simple manner, the relatively large and weak winding spring results in a half-fastened coupling of the two elements. Such a connection is, for instance, not suitable for use in a process such as the braiding of concrete reinforcement rods. If a stronger connection is desired, then the embodiment shown in FIG. 17 will have to be used, that is to say the mutual connection of these rods by means of iron wire, which is wound around the rods, after which the ends of the iron wire are intertwined and cut to size. Such a method is not only very labor-intensive, but also physically hard, and often leads to somatic complaints and even incapacity for work.

Inter alia for the above reasons, an intensive search has been made for methods of relieving and simplifying this work. This has led to different types of connecting and clamping members, which may or may not be fitted mechanically, as, for instance, shown in U.S. Pat. No. 4,388,791, EP-A-0 485 332, EP-A-0 560 707, EP-A-0 657 597, WO-A-94/13902, WO-A-90/13718, and WO-A-90/03484. It concerns both members manufactured from wire shaped material and more solid members. The former members practically always require for realizing a connection that the members and the fitting tool engage from above below the crossing point, which hardly, if at all, reduces the complexity of the operations to be carried out with respect to the above-discussed concrete braiding and further often requires robust means for enabling the realization of the connection. In addition, the connecting members, after fitting, are often not really fixed, because the techniques used do not remove the elasticity from the connecting members. If, however, connecting members fastened by snapping are too much stressed, then the risk of detachment occurs. These last drawbacks can occur to a lesser extent 15 with more solid members, but they, on the other hand, have the drawback that they strongly impede the contact between the reinforcement rods and the concrete at the connecting place. A drawback of both types of members is that they are often only suitable for crossing rods, while in such a concrete construction connections also have to be provided in other situations, for instance a connection between parallel rods or a connection in which a rod bent through, for instance, 90° has to be connected at its bending point with a crossing rod or a connection between two parallel rods and one rod crossing them. Besides, such members are often adjusted to a specific rod diameter, while in a concrete construction the diameters of the reinforcement rods to be used may vary, so that several types of members have to be kept in stock and have to be within reach during the connecting work. All these drawbacks have had the result that the various solutions have not found acceptance and the concrete braiding still largely takes place in the ancient difficult and physically hard manner.

The invention has for its object to provide a connecting method in which the above-described problems have been removed substantially, if not entirely.

This is achieved according to the invention by a process of the type defined in the opening paragraph, if the selected winding spring is a spiral or screw spiral shaped spring, of which at least one winding has a diameter smaller than the largest transverse dimension at the connecting place, determined by the elongated elements to be connected, which winding spring is placed with its center line at an angle with respect to the elongated elements and is screwingly moved from a thus obtained starting position in the direction of the elongated elements, which screwing movement is continued until at least one winding is diametrically expanded. Through these measures the connection can be made with a simple rotating movement from one side. The expansion of the winding spring not only has the result that the elongated elements to be connected are smoothly enclosed, but also removes the elasticity from the connecting member, so that it fits around the elongated elements in a firmly gripping and clamping manner. Because one or a plurality of windings of the spring are diametrically expanded, the elongated elements to be connected can be clamped together very vigorously, while the same winding spring can be used for a range of rod diameters. Furthermore, with the winding spring not only a connection between two crossing rods can be made, but also connections between otherwise oriented and designed reinforcement rods can be realized without problems. Furthermore, the winding spring, in the fitted position, will substantially only locally be in contact with the thus connected reinforcement rods, which optimizes the contact between these rods and the concrete cast around them. All in all, this is a very simple method providing a wealth of advantages and favorable effects.

According to a further embodiment of the invention it is preferred that the winding spring is manufactured from spring steel and the screwing movement is continued until at least one winding is plastically deformed. With such a connecting member manufactured from spring steel a great pressing force can be obtained with a relatively short elastic expansion, while the subsequent relatively great possible plastic expansion, with a substantially reduced increase in the pressing force, makes the connecting member suitable for a large range of different cross-sections of the elements to be connected.

To further streamline the screwing fitting of the winding spring during the making of the connection, it is preferred according to a further embodiment of the invention that the center line of the winding spring, during the screwing on and around the elongated elements, is inclinedly oriented at an angle deviating from 90° with respect to the elongated elements. This measure improves the locating effect of the spring windings sliding inclinedly along an elongated element, which facilitates the enclosure by the winding spring of the elongated elements to be connected.

More in particular, the above enclosure takes place according to the invention since of a winding spring with two free ends one of these ends is brought into sliding contact with the circumferential surface of one of the elongated elements to be connected and, by rotation on the center line while maintaining contact with the circumferential surface of that one elongated element, is brought by a part of the winding spring connecting to that end into sliding contact with the circumferential surface of a further elongated element, after which, by further rotation of the connecting member, the above end thereof is moved enclosingly along the circumferential surface of the further elongated element, then leaves that circumferential surface again and may or may not be brought into sliding contact with the circumferential surface of the one elongated element and begins to surround it enclosingly, while the spring force generated by thus fitting the winding spring resiliently presses against each other the two elongated elements to be connected.

The winding springs to be used may have all kinds of forms. Thus, a spiral screw spring conically diverging in the unloaded starting position may be considered, but also possible is a flat spiral spring, in which case it is preferred according to a further embodiment of the invention that at the start of the screwing on the elongated elements an end of the winding spring is bent out to create between the windings a space for receiving the first elongated element on which the winding spring is screwed. After a first part of such a flat spiral spring has been bent out, the rest of the winding spring, during the further screwing around an elongated element, is automatically drawn out of its initial flat configuration.

As already observed, such a connection is to be realized by simply, and from one only side, screwing on the winding spring. This also renders it possible to simply mechanize the method, for instance by, according to further embodiment of the invention, realizing the rotation of the winding spring on the center line by means of a motor drive.

To enable the use of a mechanical fitting method, it is preferred according to a further embodiment of the invention that a plurality of winding springs combined to a cylindrical assembly by placing them side by side and fastening them together are rotated with respect to separating means and are longitudinally shifted such that the separating means come into contact with at least one of the ends of the winding spring which confines the cylindrical assembly at one end, so that as a result of the rotation with respect to each other of the separating means and the cylindrical assembly the above winding spring is detached from the cylindrical assembly, while one of the ends of the above winding spring is guided in the direction of the elongated elements and is screwed on or around them by continued rotation. These measures enable the successive fitting of a series of winding springs on or around one or a plurality of elongated elements, that is to say in a very convenient and rapid manner, because it is not necessary to repeatedly pick up a loose new winding spring, but it suffices to situate the cylindrical assembly at a desired and suitable place and then rotate the separating means and the cylindrical assembly with respect to each other to separate and screw on a winding spring.

According to a further embodiment of the invention the cylindrical assembly can be arranged stationarily and the separating means can be rotated. In such an embodiment the cylindrical assembly can be simply handled and placed, and it is not necessary to allow for a decreasing rotating mass during the successive fitting of a series of winding springs. A winding spring is separated and guided preferably since, according to a further embodiment of the invention, the rotating separating means are pushingly brought into contact with a first end of the above winding spring, as a result of which this winding spring is separated from the cylindrical assembly and rotated and a second end of the above winding spring is guided in the direction of the elongated elements.

Another possibility for further elaborating the method according to the invention is obtained, if the separating means are arranged stationarily and the cylindrical assembly is rotated. Here it is further advantageously possible that the separating means, during the rotation of the cylindrical assembly, splittingly come into contact with a leading end of the above winding spring and an adjacent winding spring of the cylindrical assembly and the above leading end is guided in the direction of the elongated elements. In this embodiment the separating means ensure that both a winding spring is detached from the cylindrical assembly and this winding spring is guided to the elongated elements on or around which this winding spring has to be fitted.

Also, a combination of both above-mentioned embodiments is possible, that is to say both the rotation of the separating means and the rotation of the cylindrical assembly. A possible embodiment of such a combination of movements is obtained, if the cylindrical assembly is arranged for rotation through a limited angle and is kept in a first position until the cylindrical assembly, during the realization of the pushing contact, is rotated through a limited angle into a second position, while a splitting member, during the rotation through the limited angle, separates the second end and a part of the above winding spring connecting thereto from the cylindrical assembly, which subsequently, in the second position, is blocked against further rotation, after which the above winding spring is completely separated from the cylindrical assembly by further rotation of the separating means, after which the cylindrical assembly is returned from the second position into the first position.

The guiding of the winding spring to the elongated elements after the separation further gives the advantageous possibility that, independently of the end form of the winding spring on or around the elongated elements, according to a further preferred embodiment of the invention, each winding spring is manufactured in the form of a flat disk and the outer end is axially bent out of that disk form when guided to the object.

The invention also comprises a winding spring as it can be used in one of the methods discussed above and laid down in the appended claims, which winding spring may have a spiral or screw spiral form and may be manufactured from a resilient wire- or strand-like material, in which connection a winding spring is especially preferred.

To facilitate the location of the winding spring during the screwing-on movement, more in particular to avoid jamming against edges, ribs or similar projections, it is preferred according to a further embodiment of the invention that one of the ends is rounded, which may further be elaborated by realizing the rounding by bending the above end curvedly outwards.

If according to a further embodiment of the invention one of the ends is bent hook- or eyewise in the direction of the center line to form a handle for the purpose of enabling rotation of the winding spring on its center line, the screwing of the winding spring on and around the elongated elements, for instance by hand, is considerably facilitated. If the motor driven screwing on of the winding spring is intended, then it is preferred that one of the ends is bent back inwards to form a gripping part for a tool to enable rotation of the winding spring on its center line.

Furthermore, the winding spring may be provided in its windings with at least one bend which indicates a specific arresting or end position for the screwing on.

As material for the winding spring both a metal, such as spring steel, and a plastic are eligible.

Furthermore, the invention relates to a cylindrical assembly of at least two identical spiral or screw spiral shaped winding springs manufactured from a resilient wire- or strand-like material, while each winding spring has a curved form with a first and a second end and the at least two winding springs with the first and second ends in alignment are mutually detachably attached to each other.

A cylindrical assembly is preferred, while of each of the at least two winding springs the first end is an outer end and the second end is an inner end, and the inner end is overlapped by the outer end. Each of the at least two winding springs may have the form of a flat disk or also the form of a conical spiral spring or another form depending on the use for which the winding spring is intended, while it is further possible that of each of the at least two winding springs at least one of the ends is bent hookwise.

With reference to the exemplary embodiments shown in the drawings the invention will now be specified, although only by way of example. In the drawings.

Figure 1:
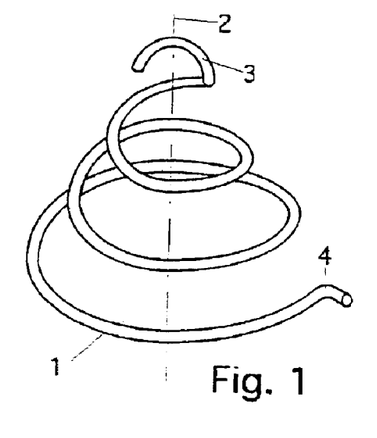
FIG. 1 shows a possible embodiment of the screw spiral shaped winding spring.

FIG. 1 shows a screw spiral shaped winding spring made of a resilient steel wire and provided with a central part 1 consisting of helical windings which, seen in FIG. 1 from above to below, extend spirally, that is to say have a constantly increasing radius relative to the center line 2. At the narrow upper end the central part 1 merges into a hook part 3 which is bent through 90° and thus extends perpendicularly to the central part 1 in the direction of the center line 2. The hook part 3 forms a handle with which the winding spring can be rotated in a relatively simple manner about its center line 2. At the broad lower end located opposite the hook part 3 the central part 1 ends in a bent locating end 4.

Figure 2:
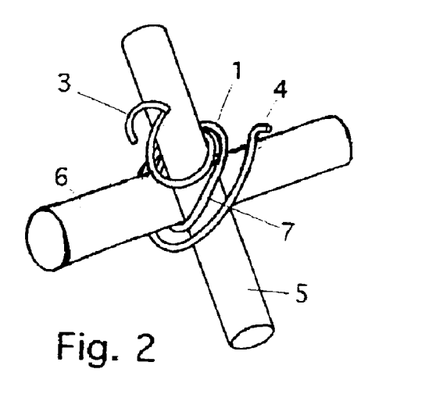
FIG. 2 shows two crossing rods connected by a winding spring of FIG. 1.

FIG. 2 shows two rods 5 and 6 crossing each other and connected by means of a winding spring of FIG. 1. The connection is realized by laying the locating end 4 at, for instance, the place of the rod 5 indicated by point 7, while the winding spring is preferably held in a slightly inclined position with respect to the crossing rods 5 and 6.

Subsequently, the winding spring was rotated around its center line by means of the hook part 3, as a result of which the locating end 4 began to describe a path which was inclined with respect to both the rod 5 and the rod 6. Meanwhile the locating end 4 first slid over the circumferential surface of the rod 5, then left that circumferential surface upon further rotation of the winding spring, until the locating end 4 contacted the circumferential surface of the rod 6. After the realization of this contact and further rotation of the winding spring the locating end 4 was resiliently pressed outwards and began to glide over the lower surface of the rod 6, not visible in FIG. 1. Beyond that lower end the locating end 4 left the circumferential surface of the rod 6 upon further rotation of the winding spring and, during that further rotation, came into contact with the circumferential surface of the rod 5. By further rotating the contact with the rod 5 was broken again and then, for the second time, the rod 6 was contacted. After another full rotation the situation shown in FIG. 1 was reached, in which the locating end 4 had again come just out of contact with the circumferential surface of the rod 6.

Because during the screwing around the rods 5 and 6 the winding spring is diametrically expanded, it fits firmly, resiliently on and around the rods 5 and 6 and, in turn, presses them resiliently and clampingly against each other. Because both the winding spring and the rods have curved surfaces, the mutual contacts will only be locally, so that concrete to be poured on and around this connection can optimally contact the rods 5 and 6. It is further observed that the rods 5 and 6 have mutually different diameters, but that this does not affect the connection realized. At equal diameters the connection was realized in the same manner.

Figure 3:
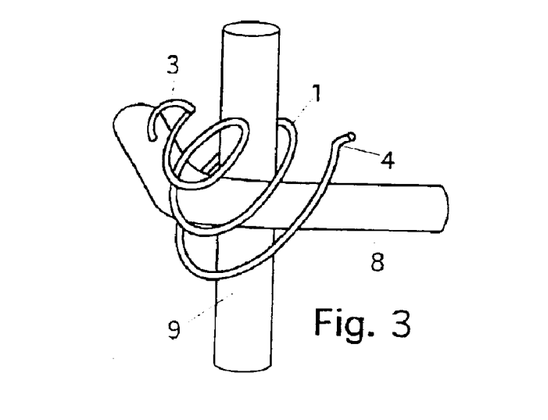
FIG. 3 shows a bent rod crossed at its bending point by a straight rod and connected therewith at that crossing point by a winding spring of FIG. 1.

FIG. 3 shows a rod 8 bent through 90°, which is crossed by a straight rod 9 at the bending place. Both rods 8 and 9 are mutually connected at their crossing point by a winding spring of the type shown in FIG. 1. The manner in which this connection has been realized corresponds to the manner discussed with reference to FIG. 2, although the winding spring has rotated one time less and is provided with spiral shaped windings, which increase such that in the position shown in FIG. 3 the largest spiral shaped winding, that is to say the winding connecting to the locating end 4, no longer contacts the rods 8 and 9. With a winding spring of such design it is possible without anything more to mutually connect rods having larger diameters or more than two rods.

Figure 4:
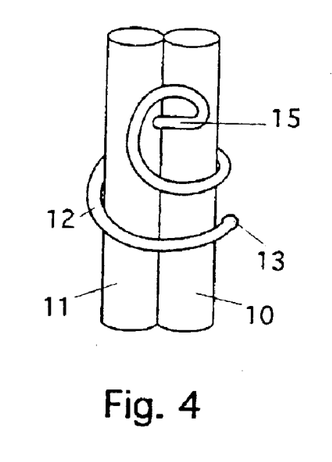
FIG. 4 shows two parallel rods connected by a winding spring.
Figure 5:
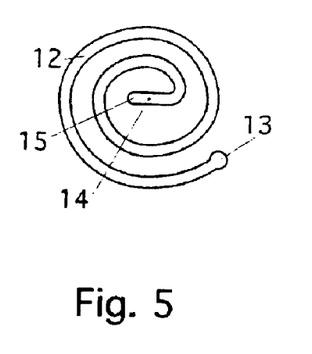
FIG. 5 shows a possible embodiment of a flat spiral spring.

FIG. 4 shows two parallel rods 10 and 11, which are mutually connected by an initially flat spiral shaped winding spring, as shown in FIG. 5. This winding spring, for instance of plastic, is provided with a spiral shaped part 12, of which the outer arm ends in a rounded end 13 and the inner arm ends in a straight part 15 extending through the center line 14. This part 15 can be received in a diametrical end groove of a motor driven shaft of a tool, for instance a drilling or screwing machine. This winding spring is thus rotatable for realizing a connection between two or more rods. In FIG. 4 these are the two parallel rods 10 and 11. To realize the connection shown, first the rounded end 13 is bent out of the spring plane and brought into sliding contact with the circumferential surface of the rod 10, while the winding spring was held at approximately 45° with respect to the plane through the center lines of both rods 10 and 11. Further rotation of the winding spring had the result that through the spiral form the rounded end 13 first became detached from the circumferential surface of the rod 10 and then came into sliding contact with the circumferential surface of the rod 11, subjacent in FIG. 4, while through that sliding contact the winding spring was expanded and then the rounded end 13 came into view again in FIG. 4. By rotating the winding spring half a turn further, the position shown in FIG. 4 was reached.

It is further observed that after the initial active bending of the rounded end 13 out of the spring plane the further drawing out of the initial flat spring plane and diametrical expansion of the windings, during which the position drawn out in the direction of the center line and shown in FIG. 4 was obtained, was automatically realized by the screwing on the rods 10 and 11.

Figure 6:
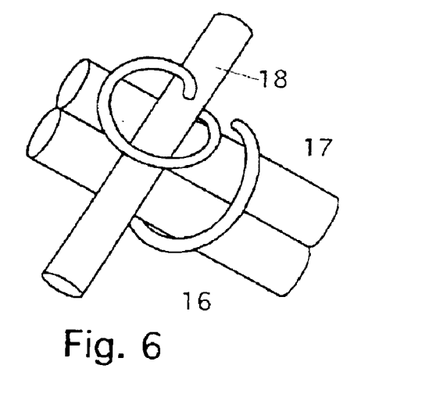
FIG. 6 shows two parallel and one crossing rod connected by a winding spring.

FIG. 6 shows two parallel rods 16 and 17, which are crossed by a rod 18, which rods are mutually connected at their crossing point by a winding spring. The winding spring is screwed around the rods such that the winding spring, which first lies on the rod 18, after passing the rods 16 and 17 at the back in FIG. 6, extends below the rod 18. If desired, it is also possible to allow the winding spring, after passing the back of the rods 16 and 17, to extend over the rod 18.

Figure 7:
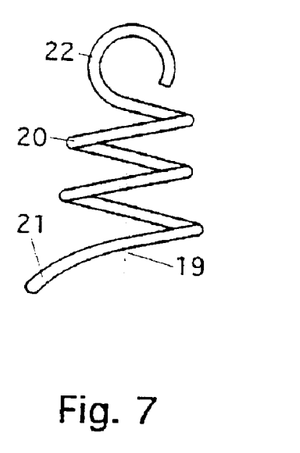
FIG. 7 shows a possible embodiment of a partly cylindrical screw spring.

FIG. 7 shows a partly cylindrical helical winding spring, which is provided with a central part 20 helically wound on a center line 19, which, on the one hand, extends into a diametrically widened winding ending in an outwardly and downwardly bent locating end 21 and, on the other hand, into a bent eye part 22 extending in the direction of the center line 19 and serving as gripping part for rotating the winding spring.

Figure 8:
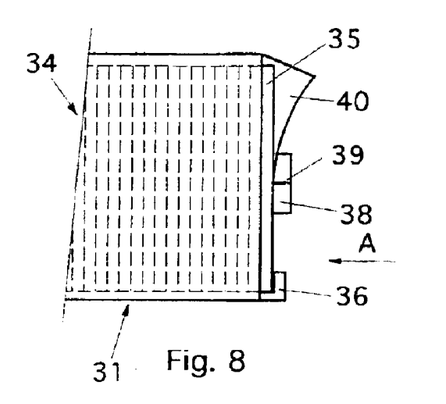
FIG. 8 shows a side view of a holder with a cylindrical assembly included therein.
Figure 9:
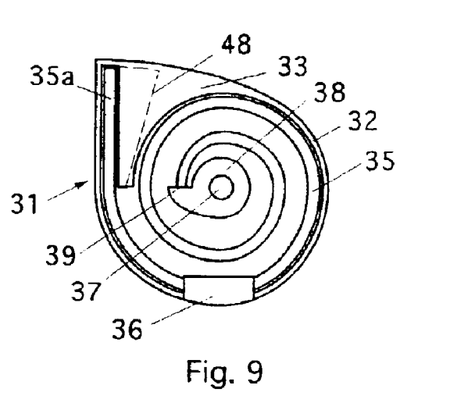
FIG. 9 shows a view according to the arrow in FIG. 8.

FIG. 8 shows a holder 31, which, as most clearly visible from FIG. 9, has a tube wall 32 with a cam-shaped protuberance 33. The holder is designed to slidingly and guidingly receive a series of winding springs 35 mutually connected to a cylindrical assembly 34. Each winding spring 35 has the form of a flat spiral ending in a straight leg part 35a, which extends into a corresponding recess in the cam-shaped protuberance 33. The cylindrical assembly 34 is pressed by spring means not shown, seen in FIG. 8 to the left, against a stop 36, which is designed and situated such that just one winding spring 35 extends to outside the holder 31. The tube wall 32 has a form adapted to the form of the flat spiral, that is to say a form comparable to that of a spiral casing for a centrifugal ventilator. Positioned centrally in the holder 31 is a rotatable shaft 37, at the end of which a separating element 38 is attached, which has a stop face 39 capable of abutting on the inner end of the flat spiral of the winding spring 35 extending to outside the holder 31. The stop face is therefore provided completely outside the tube wall 32. Provided on the cam-shaped protuberance is a projection 40, which projects in line with the holder 31 and, seen from the recess into which the leg part 35a extends, flowingly extends outwardly, as clearly visible from FIGS. 8 and 10.

For separating a winding spring 35 from the assembly 34 the shaft 37 is driven, seen in FIG. 9, clockwise. The stop face 39 presses against the free inner end of the flat spiral and thus separates the outer winding spring 35 of the assembly 34. The detached winding spring 35 is rotated by the shaft 37 via the separating element 38 with the stop face 39, while the leg part 35a moves axially outwards by striking against the projection 40. The stop 36, the form and number of which, if desired, may vary, ensures that the other part of the winding spring 35 remains in its starting plane. The bent leg part can be guided in the direction of an object, on or around which the winding spring has to be fitted. The eventual detachment from the stop 36 occurs automatically through the spiral form of the winding spring 35 and the bending outwards of an increasingly larger part of that winding spring. This has the result that at a given moment a part of the winding spring rotates along the stop 36 with such a small radius that this part is no longer covered and is arrested by that stop 36 and thus becomes completely detached from the holder 31.

Figure 11:
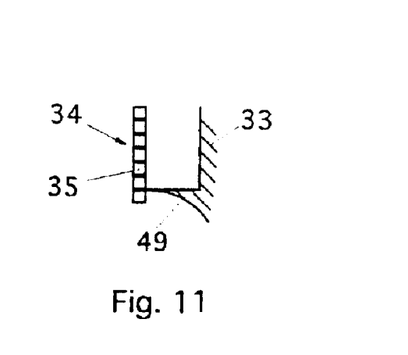
FIG. 11 shows a possible structural variant.

FIG. 11 shows a possible structural variant with which the separation of a winding spring 35 from an assembly 34 can be realized in phases. To this end, the recess in which the leg part 35a is located is increased as indicated by a dash line 48 in FIG. 9, while the assembly 34 is pressed into the position shown in FIG. 9 by spring force through means not shown. When the shaft 37 is rotated, the assembly 34 will rotate in its entirety through the angle allowed by the enlarged recess. The widened recess is closed at the outer side by a splitting member 49, which upon rotation of the assembly 34 detaches the leg part 35a of the outer winding spring 35 from the assembly 34. After the assembly 34 strikes with its leg parts 35a within the holder 31 against the end wall of the widened recess, the outer winding spring 35, by further driving the shaft 37 in the manner as described above, is detached in its totality from the assembly 34 and guided to an object. After the outer winding spring 35 has been detached from the assembly 34, the spring force ensures that this assembly 34 is returned to its starting position shown in FIG. 9.

Figure 12:
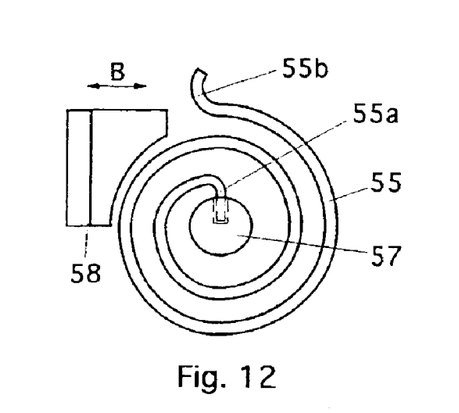
FIG. 12 shows a front view of a further embodiment.
Figure 13:
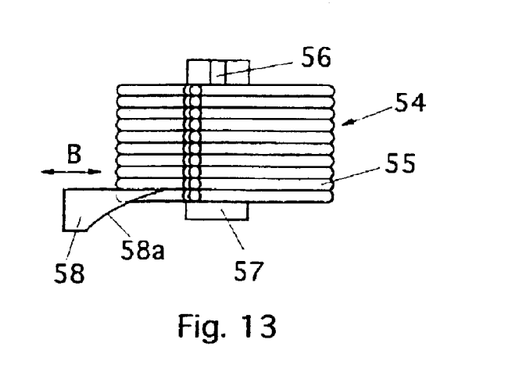
FIG. 13 shows a top view of the embodiment of FIG. 12.

FIGS. 12 and 13 show an assembly 54 formed by a large number of winding springs 55 mutually connected together. Each winding spring 55 has the form of a flat spiral with both an inner end 55a and an outer end 55b which is bent in the form of a hook. The hook shaped inner end 55a of each winding spring 55 is passed into a slot 56 in a rotatable shaft 57. The slot 56 ends before the leading end of the shaft 57, while the end of the slot 56 forms a stop member for the assembly 54 resiliently pressed in the direction of the slot end via means not shown, which assembly 54 is thus always accurately held and positioned. By means of the shaft 57 the whole assembly 54 can be rotated. During such a rotation the outer end 55b comes into contact with a splitting member 58 with a rising projection face 58a, which gradually, starting with the outer end 55b, separates the outer winding spring 55, while bending it outwards, from the assembly 54. If desired, the splitting member 58 is movable back and forth in the direction of the double arrow B.

It is self-explanatory that within the scope of the invention as laid down in the appended claims many modifications and variations are possible. Thus, for instance, with a winding spring many other forms and numbers of rods can be mutually connected. Although reference has always been made to reinforcement rods, these could also be other elongated elements. Furthermore, a winding spring could be provided in its windings with one or a plurality of bends which can indicate specific arresting or final positions. If this is preferred in specific cases of application, the windings, instead of being circular, could also have another configuration, such as, for instance, the form of an oval. Moreover, the windings may have a cross-section deviating from the form of a circle, such as, for instance, the form of a square. Besides bending and/or rounding a locating end, the resulting shooting-through effect in case of obstructions may also be promoted in a different manner, for instance by coating the end with a material promoting sliding or by a tip rounded by means of tin-plating. Furthermore, a guide ridge for the part of a winding spring detached from the cylindrical assembly may also be considered, which ridge not only imparts a bending outwards, but also a bending perpendicular thereto. It will be clear that by suitably guiding the winding spring detached and rotated further any desired bending suitable for the relevant case of application can be realized. As regards the material for manufacturing the winding springs, it is observed that this may be any desired and suitable plastic, besides of course a metal, such as preferably spring steel.

What is claimed is:

1. A method for connecting two elongated elements, having circumferential outer surfaces, by a connecting member incorporating a spiral shaped winding spring having a center line, the method comprising the steps of screwing the spring on and around the elongated elements at a connecting place disposed between the elongated elements by rotation on the center line while axially expanding the spring by contact with the circumferential outer surfaces of the elongated elements;

the winding spring having a center line and at least one winding having a diameter smaller than a largest transverse dimension at a connection place determined by the elongated elements to be connected, the winding spring having a position at a starting point wherein said center line is disposed at an angle relative to the elongated elements, the winding spring being moved by a screwing movement from said starting point toward said elongated elements, wherein said screwing movement is continued until at least one winding is diametrically expanded.

2. A method according to claim 1, characterized in that the winding spring is manufactured from spring steel and the screwing movement is continued until at least one winding is plastically deformed.

3. A method according to claim 1, characterized in that during the screwing on and around the elongated elements the center line of the winding spring is oriented in a position inclined at an angle deviating from 90° with respect to the elongated elements.

4. A method according to claim 1, characterized in that of a winding spring with two free ends one of these ends is brought into sliding contact with the circumferential surface of one of the elongated elements to be connected and, by rotation on the center line while maintaining contact with the circumferential surface of that one elongated element is brought by a part of the winding spring connecting to that end into sliding contact with the circumferential surface of a further elongated element, after which, by further rotation of the connecting member, the above end thereof is moved enclosingly along the circumferential surface of the further elongated element, then leaves that circumferential surface again and may or may not be brought into sliding contact with the circumferential surface of the one elongated element and begins to surround it enclosingly, while the spring force generated by thus fitting winding spring resiliently presses against each other the two elongated elements to be connected.

5. A method according to claim 1, characterized in that at the start of the screwing on the elongated elements an end of the winding spring is bent out to create between the windings a space for receiving the first elongated element on which the winding spring is screwed.

6. A method according to claim 1, characterized in that the rotation of the winding spring on the center line is realized by means of a motor drive.

7. A method according to claim 1, characterized in that a plurality of winding springs combined to a cylindrical assembly by placing them side by side and fastening them together are rotated with respect to separating means and are longitudinally shifted such that the separating means come into contact with at least one of the ends of the winding spring which confines the cylindrical assembly at one end, through which as a result of the rotation with respect to each other of the separating means and the cylindrical assembly, while one of the ends of the above winding spring is guided in the direction of the elongated elements and is screwed on or around them by continued rotation.

8. A method according to claim 7.
9. A method according to claim 8.
10. A method according to claim 8.
11. A method according to claim 7.
12. A method according to claim 11.
13. A method according to claim 7.
14. A winding spring for use in a method according to claim 1, which winding spring has a spiral or screw spiral form and is manufactured from a resilient material.
15. A winding spring according to claim 14.
16. A winding spring according to claim 15.
17. A winding spring according to claim 14.
18. A winding spring according to claim 14.
19. A winding spring according to claim 14.
20. A winding spring according to claim 14.
21. A winding spring according to claim 14.
22. A cylindrical assembly for use in a method according to claim 1 and composed of at least two identical spiral or screw spiral shaped winding springs manufactured from a resilient material, while each winding spring has a curved form with a first and a second end and the at least two winding springs with the first and second ends in alignment are mutually detachably attached to each other.
23. A cylindrical assembly according to claim 22.
24. A cylindrical assembly according to claim 22.
25. A cylindrical assembly according to claim 21.

* * * * *

UNITED STATES PATENT AND TRADEMARK OFFICE
CERTIFICATE OF CORRECTION

PATENT NO. : 6,994,485 B2  Page 1 of 7
APPLICATION NO. : 10/168291
DATED : February 7, 2006
INVENTOR(S) : Konig It is certified that error appears in the above-identified patent and that said Letters Patent is hereby corrected as shown below:

Please delete column 1 line 1 through column 10 line 47 and insert column 1 line 1 through column 12 line 3 as attached Signed and Sealed this Fifteenth Day of April, 2008

JON W. DUDAS
*Director of the United States Patent and Trademark Office*

METHOD AND APPARATUS FOR MUTUALLY CONNECTING ELONGATED ELEMENTS, SUCH AS REINFORCEMENT RODS

The invention relates to a method for mutually connecting at least two elongated elements, such as concrete reinforcement rods, by means of a connecting member in the form of a winding spring with a center line, which winding spring is screwed on and around the elongated elements at the connecting place between the two elongated elements by rotation on the center line while expanding by contact with circumferential surfaces of the elongated elements. The invention also relates to a connecting member and assembly of connecting members to be used in such a connecting method.

A method as defined above is known from JP-A-03 221665. According to the embodiment shown in FIGS. 5-7 two elongated elements are coupled by screwing around the elements to be connected a relatively weak winding spring having an open inner diameter which is approximately equal to the joint diameters of the elements to be connected. Although a connecting member can thus be fitted in a relatively rapid and simple manner, the relatively large and weak winding spring results in a half-fastened coupling of the two elements. Such a connection is, for instance, not suitable for use in a process such as the braiding of concrete reinforcement rods. If a stronger connection is desired, then the embodiment shown in FIG. 17 will have to be used, that is to say the mutual connection of these rods by means of iron wire, which is wound around the rods, after which the ends of the iron wire are intertwined and cut to size. Such a method is not only very labor-intensive, but also physically hard, and often leads to somatic complaints and even incapacity for work.

Inter alia for the above reasons, an intensive search has been made for methods of relieving and simplifying this work. This has led to different types of connecting and clamping members, which may or may not be fitted mechanically, as, for instance, shown in U.S. Pat. No. 4,388,791, EP-A-0 485 332, EP-A-0 560 707, EP-A-0 657 597, WO-A-94/13902, WO-A-90/13718, and WO-A-90/03484. It concerns both members manufactured from wire shaped material and more solid members. The former members practically always require for realizing a connection that the members and the fitting tool engage from above below the crossing point, which hardly, if at all, reduces the complexity of the operations to be carried out with respect to the above-discussed concrete braiding and further often requires robust means for enabling the realization of the connection. In addition, the connecting members, after fitting, are often not really fixed, because the techniques used do not remove the elasticity from the connecting members. If, however, connecting members fastened by snapping are too much stressed, then the risk of detachment occurs. These last drawbacks can occur to a lesser extent with more solid members, but they, on the other hand, have the drawback that they strongly impede the contact between the reinforcement rods and the concrete at the connecting place. A drawback of both types of members is that they are often only suitable for crossing rods, while in such a concrete construction connections also have to be provided in other situations, for instance a connection between parallel rods or a connection in which a rod bent through, for instance, 90° has to be connected at its bending point with a crossing rod or a connection between two parallel rods and one rod crossing them. Besides, such members are often adjusted to a specific rod diameter, while in a concrete construction the diameters of the reinforcement rods to be used may vary, so that several types of members have to be kept in stock and have to be within reach during the connecting work. All these drawbacks have had the result that the various solutions have not found acceptance and the concrete braiding still largely takes place in the ancient difficult and physically hard manner.

The invention has for its object to provide a connecting method in which the above-described problems have been removed substantially, if not entirely.

This is achieved according to the invention by a process of the type defined in the opening paragraph, if the selected winding spring is a spiral or screw spiral shaped spring, of which at least one winding has a diameter smaller than the largest transverse dimension at the connecting place, determined by the elongated elements to be connected, which winding spring is placed with its center line at an angle with respect to the elongated elements and is screwingly moved from a thus obtained starting position in the direction of the elongated elements, which screwing movement is continued until at least one winding is diametrically expanded. Through these measures the connection can be made with a simple rotating movement from one side. The expansion of the winding spring not only has the result that the elongated elements to be connected are smoothly enclosed, but also removes the elasticity from the connecting member, so that it fits around the elongated elements in a firmly gripping and clamping manner. Because one or a plurality of windings of the spring are diametrically expanded, the elongated elements to be connected can be clamped together very vigorously, while the same winding spring can be used for a range of rod diameters. Furthermore, with the winding spring not only a connection between two crossing rods can be made, but also connections between otherwise oriented and designed reinforcement rods can be realized without problems. Furthermore, the winding spring, in the fitted position, will substantially only locally be in contact with the thus connected reinforcement rods, which optimizes the contact between these rods and the concrete cast around them. All in all, this is a very simple method providing a wealth of advantages and favorable effects.

According to a further embodiment of the invention it is preferred that the winding spring is manufactured from spring steel and the screwing movement is continued until at least one winding is plastically deformed. With such a connecting member manufactured from spring steel a great pressing force can be obtained with a relatively short elastic expansion, while the subsequent relatively great possible plastic expansion, with a substantially reduced increase in the pressing force, makes the connecting member suitable for a large range of different cross-sections of the elements to be connected.

To further streamline the screwing fitting of the winding spring during the making of the connection, it is preferred according to a further embodiment of the invention that the center line of the winding spring, during the screwing on and around the elongated elements, is inclinedly oriented at an angle deviating from 90° with respect to the elongated elements. This measure improves the locating effect of the spring windings sliding inclinedly along an elongated element, which facilitates the enclosure by the winding spring of the elongated elements to be connected.

More in particular, the above enclosure takes place according to the invention since of a winding spring with two free ends one of these ends is brought into sliding contact with the circumferential surface of one of the elongated elements to be connected and, by rotation on the center line while maintaining contact with the circumferential surface of that one elongated element, is brought by a part of the winding spring connecting to that end into sliding contact with the circumferential surface of a further elongated element, after which, by further rotation of the connecting member, the above end thereof is moved enclosingly along the circumferential surface of the further elongated element, then leaves that circumferential surface again and may or may not be brought into sliding contact with the circumferential surface of the one elongated element and begins to surround it enclosingly, while the spring force generated by thus fitting the winding spring resiliently presses against each other the two elongated elements to be connected.

The winding springs to be used may have all kinds of forms. Thus, a spiral screw spring conically diverging in the unloaded starting position may be considered, but also possible is a flat spiral spring, in which case it is preferred according to a further embodiment of the invention that at the start of the screwing on the elongated elements an end of the winding spring is bent out to create between the windings a space for receiving the first elongated element on which the winding spring is screwed. After a first part of such a flat spiral spring has been bent out, the rest of the winding spring, during the further screwing around an elongated element, is automatically drawn out of its initial flat configuration.

As already observed, such a connection is to be realized by simply, and from one only side, screwing on the winding spring. This also renders it possible to simply mechanize the method, for instance by, according to further embodiment of the invention, realizing the rotation of the winding spring on the center line by means of a motor drive.

To enable the use of a mechanical fitting method, it is preferred according to a further embodiment of the invention that a plurality of winding springs combined to a cylindrical assembly by placing them side by side and fastening them together are rotated with respect to separating means and are longitudinally shifted such that the separating means come into contact with at least one of the ends of the winding spring which confines the cylindrical assembly at one end, so that as a result of the rotation with respect to each other of the separating means and the cylindrical assembly the above winding spring is detached from the cylindrical assembly, while one of the ends of the above winding spring is guided in the direction of the elongated elements and is screwed on or around them by continued rotation. These measures enable the successive fitting of a series of winding springs on or around one or a plurality of elongated elements, that is to say in a very convenient and rapid manner, because it is not necessary to repeatedly pick up a loose new winding spring, but it suffices to situate the cylindrical assembly at a desired and suitable place and then rotate the separating means and the cylindrical assembly with respect to each other to separate and screw on a winding spring.

According to a further embodiment of the invention the cylindrical assembly can be arranged stationarily and the separating means can be rotated. In such an embodiment the cylindrical assembly can be simply handled and placed, and it is not necessary to allow for a decreasing rotating mass during the successive fitting of a series of winding springs. A winding spring is separated and guided preferably since, according to a further embodiment of the invention, the rotating separating means are pushingly brought into contact with a first end of the above winding spring, as a result of which this winding spring is separated from the cylindrical assembly and rotated and a second end of the above winding spring is guided in the direction of the elongated elements.

Another possibility for further elaborating the method according to the invention is obtained, if the separating means are arranged stationarily and the cylindrical assembly is rotated. Here it is further advantageously possible that the separating means, during the rotation of the cylindrical assembly, splittingly come into contact with a leading end of the above winding spring and an adjacent winding spring of the cylindrical assembly and the above leading end is guided in the direction of the elongated elements. In this embodiment the separating means ensure that both a winding spring is detached from the cylindrical assembly and this winding spring is guided to the elongated elements on or around which this winding spring has to be fitted.

Also, a combination of both above-mentioned embodiments is possible, that is to say both the rotation of the separating means and the rotation of the cylindrical assembly. A possible embodiment of such a combination of movements is obtained, if the cylindrical assembly is arranged for rotation through a limited angle and is kept in a first position until the cylindrical assembly, during the realization of the pushing contact, is rotated through a limited angle into a second position, while a splitting member, during the rotation through the limited angle, separates the second end and a part of the above winding spring connecting thereto from the cylindrical assembly, which subsequently, in the second position, is blocked against further rotation, after which the above winding spring is completely separated from the cylindrical assembly by further rotation of the separating means, after which the cylindrical assembly is returned from the second position into the first position.

The guiding of the winding spring to the elongated elements after the separation further gives the advantageous possibility that, independently of the end form of the winding spring on or around the elongated elements, according to a further preferred embodiment of the invention, each winding spring is manufactured in the form of a flat disk and the outer end is axially bent out of that disk form when guided to the object.

The invention also comprises a winding spring as it can be used in one of the methods discussed above and laid down in the appended claims, which winding spring may have a spiral or screw spiral form and may be manufactured from a resilient wire- or strand-like material, in which connection a winding spring is especially preferred.

To facilitate the location of the winding spring during the screwing-on movement, more in particular to avoid jamming against edges, ribs or similar projections, it is preferred according to a further embodiment of the invention that one of the ends is rounded, which may further be elaborated by realizing the rounding by bending the above end curvedly outwards.

If according to a further embodiment of the invention one of the ends is bent hook- or eyewise in the direction of the center line to form a handle for the purpose of enabling rotation of the winding spring on its center line, the screwing of the winding spring on and around the elongated elements, for instance by hand, is considerably facilitated. If the motor driven screwing on of the winding spring is intended, then it is preferred that one of the ends is bent back inwards to form a gripping part for a tool to enable rotation of the winding spring on its center line.

Furthermore, the winding spring may be provided in its windings with at least one bend which indicates a specific arresting or end position for the screwing on.

As material for the winding spring both a metal, such as spring steel, and a plastic are eligible.

Furthermore, the invention relates to a cylindrical assembly of at least two identical spiral or screw spiral shaped winding springs manufactured from a resilient wire- or strand-like material, while each winding spring has a curved form with a first and a second end and the at least two winding springs with the first and second ends in alignment are mutually detachably attached to each other.

A cylindrical assembly is preferred, while of each of the at least two winding springs the first end is an outer end and the second end is an inner end, and the inner end is overlapped by the outer end. Each of the at least two winding springs may have the form of a flat disk or also the form of a conical spiral spring or another form depending on the use for which the winding spring is intended, while it is further possible that of each of the at least two winding springs at least one of the ends is bent hookwise.

Figure 10:
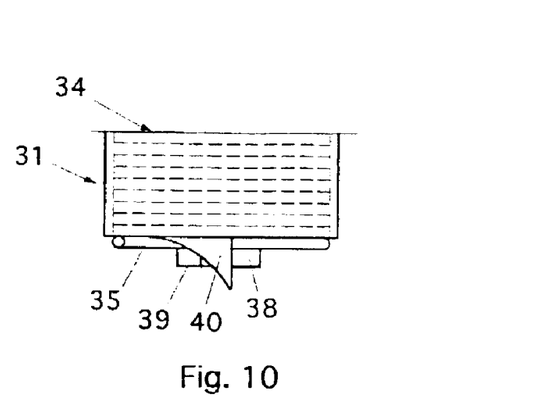
FIG. 10 shows a top view of the holder of FIGS. 8 and 9.

With reference to the exemplary embodiments shown in the drawings the invention will now be specified, although only by way of example. In the drawings:

FIG. 1 shows a possible embodiment of the screw spiral shaped winding spring;

FIG. 2 shows two crossing rods connected by a winding spring of FIG. 1;

FIG. 3 shows a bent rod crossed at its bending point by a straight rod and connected therewith at that crossing point by a winding spring of FIG. 1;

FIG. 4 shows two parallel rods connected by a winding spring;

FIG. 5 shows a possible embodiment of a flat spiral spring;

FIG. 6 shows two parallel and one crossing rod connected by a winding spring;

FIG. 7 shows a possible embodiment of a partly cylindrical screw spring;

FIG. 8 shows a side view of a holder with a cylindrical assembly included therein;

FIG. 9 shows a view according to the arrow in FIG. 8;

FIG. 10 shows a top view of the holder of FIGS. 8 and 9;

FIG. 11 shows a possible structural variant;

FIG. 12 shows a front view of a further embodiment; and

FIG. 13 shows a top view of the embodiment of FIG. 12.

FIG. 1 shows a screw spiral shaped winding spring made of a resilient steel wire and provided with a central part 1 consisting of helical windings which, seen in FIG. 1 from above to below, extend spirally, that is to say have a constantly increasing radius relative to the center line 2. At the narrow upper end the central part 1 merges into a hook part 3 which is bent through 90° and thus extends perpendicularly to the central part 1 in the direction of the center line 2. The hook part 3 forms a handle with which the winding spring can be rotated in a relatively simple manner about its center line 2. At the broad lower end located opposite the hook part 3 the central part 1 ends in a bent locating end 4.

FIG. 2 shows two rods 5 and 6 crossing each other and connected by means of a winding spring of FIG. 1. The connection is realized by laying the locating end 4 at, for instance, the place of the rod 5 indicated by point 7, while the winding spring is preferably held in a slightly inclined position with respect to the crossing rods 5 and 6.

Subsequently, the winding spring was rotated around its center line by means of the hook part 3, as a result of which the locating end 4 began to describe a path which was inclined with respect to both the rod 5 and the rod 6.

Meanwhile the locating end 4 first slid over the circumferential surface of the rod 5, then left that circumferential surface upon further rotation of the winding spring, until the locating end 4 contacted the circumferential surface of the rod 6. After the realization of this contact and further rotation of the winding spring the locating end 4 was resiliently pressed outwards and began to glide over the lower surface of the rod 6, not visible in FIG. 1. Beyond that lower end the locating end 4 left the circumferential surface of the rod 6 upon further rotation of the winding spring and, during that further rotation, came into contact with the circumferential surface of the rod 5. By further rotating the contact with the rod 5 was broken again and then, for the second time, the rod 6 was contacted. After another full rotation the situation shown in FIG. 1 was reached, in which the locating end 4 had again come just out of contact with the circumferential surface of the rod 6.

Because during the screwing around the rods 5 and 6 the winding spring is diametrically expanded, it fits firmly, resiliently on and around the rods 5 and 6 and, in turn, presses them resiliently and clampingly against each other. Because both the winding spring and the rods have curved surfaces, the mutual contacts will only be locally, so that concrete to be poured on and around this connection can optimally contact the rods 5 and 6. It is further observed that the rods 5 and 6 have mutually different diameters, but that this does not affect the connection realized. At equal diameters the connection was realized in the same manner.

FIG. 3 shows a rod 8 bent through 90°, which is crossed by a straight rod 9 at the bending place. Both rods 8 and 9 are mutually connected at their crossing point by a winding spring of the type shown in FIG. 1. The manner in which this connection has been realized corresponds to the manner discussed with reference to FIG. 2, although the winding spring has rotated one time less and is provided with spiral shaped windings, which increase such that in the position shown in FIG. 3 the largest spiral shaped winding, that is to say the winding connecting to the locating end 4, no longer contacts the rods 8 and 9. With a winding spring of such design it is possible without anything more to mutually connect rods having larger diameters or more than two rods.

FIG. 4 shows two parallel rods 10 and 11, which are mutually connected by an initially flat spiral shaped winding spring, as shown in FIG. 5. This winding spring, for instance of plastic, is provided with a spiral shaped part 12, of which the outer arm ends in a rounded end 13 and the inner arm ends in a straight part 15 extending through the center line 14. This part 15 can be received in a diametrical end groove of a motor driven shaft of a tool, for instance a drilling or screwing machine. This winding spring is thus rotatable for realizing a connection between two or more rods. In FIG. 4 these are the two parallel rods 10 and 11. To realize the connection shown, first the rounded end 13 is bent out of the spring plane and brought into sliding contact with the circumferential surface of the rod 10, while the winding spring was held at approximately 45° with respect to the plane through the center lines of both rods 10 and 11. Further rotation of the winding spring had the result that through the spiral form the rounded end 13 first became detached from the circumferential surface of the rod 10 and then came into sliding contact with the circumferential surface of the rod 11, subjacent in FIG. 4, while through that sliding contact the winding spring was expanded and then the rounded end 13 came into view again in FIG. 4. By rotating the winding spring half a turn further, the position shown in FIG. 4 was reached.

It is further observed that after the initial active bending of the rounded end 13 out of the spring plane the further drawing out of the initial flat spring plane and diametrical expansion of the windings, during which the position drawn out in the direction of the center line and shown in FIG. 4 was obtained, was automatically realized by the screwing on the rods 10 and 11.

FIG. 6 shows two parallel rods 16 and 17, which are crossed by a rod 18, which rods are mutually connected at their crossing point by a winding spring. The winding spring is screwed around the rods such that the winding spring, which first lies on the rod 18, after passing the rods 16 and 17 at the back in FIG. 6, extends below the rod 18. If desired, it is also possible to allow the winding spring, after passing the back of the rods 16 and 17, to extend over the rod 18.

FIG. 7 shows a partly cylindrical helical winding spring, which is provided with a central part 20 helically wound on a center line 19, which, on the one hand, extends into a diametrically widened winding ending in an outwardly and downwardly bent locating end 21 and, on the other hand, into a bent eye part 22 extending in the direction of the center line 19 and serving as gripping part for rotating the winding spring.

FIG. 8 shows a holder 31, which, as most clearly visible from FIG. 9, has a tube wall 32 with a cam-shaped protuberance 33. The holder is designed to slidingly and guidingly receive a series of winding springs 35 mutually connected to a cylindrical assembly 34. Each winding spring 35 has the form of a flat spiral ending in a straight leg part 35a, which extends into a corresponding recess in the cam-shaped protuberance 33. The cylindrical assembly 34 is pressed by spring means not shown, seen in FIG. 8 to the left, against a stop 36, which is designed and situated such that just one winding spring 35 extends to outside the holder 31. The tube wall 32 has a form adapted to the form of the flat spiral, that is to say a form comparable to that of a spiral casing for a centrifugal ventilator. Positioned centrally in the holder 31 is a rotatable shaft 37, at the end of which a separating element 38 is attached, which has a stop face 39 capable of abutting on the inner end of the flat spiral of the winding spring 35 extending to outside the holder 31. The stop face is therefore provided completely outside the tube wall 32. Provided on the cam-shaped protuberance is a projection 40, which projects in line with the holder 31 and, seen from the recess into which the leg part 35a extends, flowingly extends outwardly, as clearly visible from FIGS. 8 and 10.

For separating a winding spring 35 from the assembly 34 the shaft 37 is driven, seen in FIG. 9, clockwise. The stop face 39 presses against the free inner end of the flat spiral and thus separates the outer winding spring 35 of the assembly 34. The detached winding spring 35 is rotated by the shaft 37 via the separating element 38 with the stop face 39, while the leg part 35a moves axially outwards by striking against the projection 40. The stop 36, the form and number of which, if desired, may vary, ensures that the other part of the winding spring 35 remains in its starting place. The bent leg part can be guided in the direction of an object, on or around which the winding spring has to be fitted. The eventual detachment from the stop 36 occurs automatically through the spiral form of the winding spring 35 and the bending outwards of an increasingly larger part of that winding spring. This has the result that at a given moment a part of the winding spring rotates along the stop 36 with such a small radius that this part is no longer covered and is arrested by that stop 36 and thus becomes completely detached from the holder 31.

FIG. 11 shows a possible structural variant with which the separation of a winding spring 35 from an assembly 34 can be realized in phases. To this end, the recess in which the leg part 35a is located is increased as indicated by a dash line 48 in FIG. 9, while the assembly 34 is pressed into the position shown in FIG. 9 by spring force through means not shown. When the shaft 37 is rotated, the assembly 34 will rotate in its entirety through the angle allowed by the enlarged recess. The widened recess is closed at the outer side by a splitting member 49, which upon rotation of the assembly 34 detaches the leg part 35a of the outer winding spring 35 from the assembly 34. After the assembly 34 strikes with its leg parts 35a within the holder 31 against the end wall of the widened recess, the outer winding spring 35, by further driving the shaft 37 in the manner as described above, is detached in its totality from the assembly 34 and guided to an object. After the outer winding spring 35 has been detached from the assembly 34, the spring force ensures that this assembly 34 is returned to its starting position shown in FIG. 9.

FIGS. 12 and 13 show an assembly 54 formed by a large number of winding springs 55 mutually connected together. Each winding spring 55 has the form of a flat spiral with both an inner end 55a and an outer end 55b which is bent in the form of a hook. The hook shaped inner end 55a of each winding spring 55 is passed into a slot 56 in a rotatable shaft 57. The slot 56 ends before the leading end of the shaft 57, while the end of the slot 56 forms a stop member for the assembly 54 resiliently pressed in the direction of the slot end via means not shown, which assembly 54 is thus always accurately held and positioned. By means of the shaft 57 the whole assembly 54 can be rotated. During such a rotation the outer end 55b comes into contact with a splitting member 58 with a rising projection face 58a, which gradually, starting with the outer end 55b, separates the outer winding spring 55, while bending it outwards, from the assembly 54. If desired, the splitting member 58 is movable back and forth in the direction of the double arrow B.

It is self-explanatory that within the scope of the invention as laid down in the appended claims many modifications and variations are possible. Thus, for instance, with a winding spring many other forms and numbers of rods can be mutually connected. Although reference has always been made to reinforcement rods, these could also be other elongated elements. Furthermore, a winding spring could be provided in its windings with one or a plurality of bends which can indicate specific arresting or final positions. If this is preferred in specific cases of application, the windings, instead of being circular, could also have another configuration, such as, for instance, the form of an oval. Moreover, the windings may have a cross-section deviating from the form of a circle, such as, for instance, the form of a square. Besides bending and/or rounding a locating end, the resulting shooting-through effect in case of obstructions may also be promoted in a different manner, for instance by coating the end with a material promoting sliding or by a tip rounded by means of tin-plating. Furthermore, a guide ridge for the part of a winding spring detached from the cylindrical assembly may also be considered, which ridge not only imparts a bending outwards, but also a bending perpendicular thereto. It will be clear that by suitably guiding the winding spring detached and rotated further any desired bending suitable for the relevant case of application can be realized. As regards the material for manufacturing the winding springs, it is observed that this may be any desired and suitable plastic, besides of course a metal, such as preferably spring steel.

The invention claimed is:

1. A method for mutually connecting at least two elongated elements, such as concrete reinforcement rods, by means of a connecting member in the form of a winding spring with a center line, which winding spring is screwed on and around the elongated elements at the connecting place between the two elongated elements by rotation on the center line while expanding by contact with circumferential surfaces of the elongated elements, characterized in that the selected winding spring is a spiral or screw spiral shaped spring, of which at least one winding has a diameter smaller than the largest transverse dimension at the connecting place, determined by the elongated elements to be connected, which winding spring is placed with its center line at an angle with respect to the elongated elements and is screwingly moved from a thus obtained starting position in the direction of the elongated elements, which screwing movement is continued until at least one winding is diametrically expanded.

2. A method according to claim 1, characterized in that the winding spring is manufactured from spring steel and the screwing movement is continued until at least one winding is plastically deformed.

3. A method according to claim 1 or 2, characterized in that during the screwing on and around the elongated elements the center line of the winding spring is oriented in a position inclined at an angle deviating from 90° with respect to the elongated elements.

4. A method according to any one of the preceding claims, characterized in that of a winding spring with two free ends one of these ends is brought into sliding contact with the circumferential surface of one of the elongated elements to be connected and, by rotation on the center line while maintaining contact with the circumferential surface of that one elongated element, is brought by a part of the winding spring connecting to that end into sliding contact with the circumferential surface of a further elongated element, after which, by further rotation of the connecting member, the above end thereof is moved enclosingly along the circumferential surface of the further elongated element, then leaves that circumferential surface again and may or may not be brought into sliding contact with the circumferential surface of the one elongated element and begins to surround it enclosingly, while the spring force generated by thus fitting the winding spring resiliently presses against each other the two elongated elements to be connected.

5. A method according to any one of the preceding claims, characterized in that at the start of the screwing on the elongated elements an end of the winding spring is bent out to create between the windings a space for receiving the first elongated element on which the winding spring is screwed.

6. A method according to any one of the preceding claims, characterized in that the rotation of the winding spring on the center line is realized by means of a motor drive.

7. A method according to any one of the preceding claims, characterized in that a plurality of winding springs combined to a cylindrical assembly by placing them side by side and fastening them together are rotated with respect to separating means and are longitudinally shifted such that the separating means come into contact with at least one of the ends of the winding spring which confines the cylindrical assembly at one end, through which as a result of the rotation with respect to each other of the separating means and the cylindrical assembly the above winding spring is detached from the cylindrical assembly, while one of the ends of the above winding spring is guided in the direction of the elongated elements and is screwed on or around them by continued rotation.

8. A method according to claim 7, characterized in that the cylindrical assembly is arranged stationarily and the separating means are rotated.

9. A method according to claim 8, characterized in that the rotating separating means are pushingly brought into contact with a first end of the above winding spring, as a result of which it is separated from the cylindrical assembly and rotated and a second end of the above winding spring is guided in the direction of the elongated elements.

10. A method according to claim 8, characterized in that the cylindrical assembly is arranged for rotation through a limited angle and is kept in a first position until the cylindrical assembly, during the realization of the pushing contact, is rotated through a limited angle into a second position, while a splitting member, during the rotation through the limited angle, separates the second end and a part of the above winding spring connecting thereto from the cylindrical assembly, which subsequently, in the second position, is blocked against further rotation, after which the above winding spring, by further rotation of the separating means, is completely separated from the cylindrical assembly, after which the cylindrical assembly is returned from the second position into the first position.

11. A method according to claim 7, characterized in that the separating means are arranged stationarily and the cylindrical assembly is rotated.

12. A method according to claim 11, characterized in that the separating means, during rotation of the cylindrical assembly, splittingly come into contact with a leading end of the above winding spring and an adjacent winding spring of the cylindrical assembly and the above leading end is guided in the direction of the elongated elements.

13. A method according to claim 7 or 8, characterized in that each winding spring is manufactured in the form of a flat disk and the outer end is axially bent out of that disk form when guided to the object.

14. A winding spring for use in a method according to any one of the preceding claims, which winding spring has a spiral or screw spiral form and is manufactured from a resilient wire- or strand-like material.

15. A winding spring according to claim 14, wherein one of the ends is rounded.

16. A winding spring according to claim 15, wherein the rounding is realized by bending the above end curvedly outwards.

17. A winding spring according to any one of claims 14-16, wherein one of the ends is bent eyewise in the direction of the center line to form a handle for the purpose of enabling rotation of the winding spring on its center line.

18. A winding spring according to any one of claims 14-16, wherein one of the ends is bent back inwards to form a gripping part for a tool to enable rotation of the winding spring on its center line.

19. A winding spring according to any one of claims 14-18, wherein the windings have at least one bend arranged therein.

20. A winding spring according to any one of clams 14-19 and manufactured from spring steel wire.

21. A winding spring according to any one of claims 14-19 and manufactured from plastic.

22. A cylindrical assembly for use in a method according to any one of the preceding claims and composed of at least two identical spiral or screw spiral shaped winding springs manufactured from a resilient wire- or strand-like material, while each winding spring has a curved form with a first and a second end and the at least two winding springs with the first and second ends in alignment are mutually detachably attached to each other.

23. A cylindrical assembly according to claim 22, characterized in that of each of the at least two winding springs the first end is an outer end and the second end is an inner end, and the inner end is overlapped by the outer end.

24. A cylindrical assembly according to claim 22 or 23, characterized in that each of the at least two winding springs has the form of a flat disk.

25. A cylindrical assembly according to any of claims 21-23, characterized in that of each of the at least two elements at least one of the ends is bent hookwise.

* * * * *